(12) United States Patent
Goto et al.

(10) Patent No.: US 8,257,479 B2
(45) Date of Patent: Sep. 4, 2012

(54) WATER-BASED INK FOR INK-JET RECORDING, INK CARTRIDGE, AND INK-JET RECORDING APPARATUS

(75) Inventors: Kazuma Goto, Nagoya (JP); Yuko Iwamura, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 433 days.

(21) Appl. No.: 12/604,502

(22) Filed: Oct. 23, 2009

(65) Prior Publication Data

US 2010/0101452 A1    Apr. 29, 2010

(30) Foreign Application Priority Data

Oct. 24, 2008  (JP) .................................. 2008-273886
Mar. 4, 2009   (JP) .................................. 2009-051230

(51) Int. Cl.
*C09D 11/02* (2006.01)
*B41J 2/01* (2006.01)

(52) U.S. Cl. ................... 106/31.48; 106/31.43; 347/86; 347/100

(58) Field of Classification Search .............. 106/31.48, 106/31.43; 347/86, 100
See application file for complete search history.

(56) References Cited

U.S. PATENT DOCUMENTS

| | | | |
|---|---|---|---|
| 5,370,731 A | 12/1994 | Yamashita et al. | |
| 5,478,383 A * | 12/1995 | Nagashima et al. | 106/31.43 |
| 5,560,771 A | 10/1996 | Takemoto et al. | |
| 5,571,313 A * | 11/1996 | Mafune et al. | 106/31.43 |
| 5,853,468 A | 12/1998 | Yamazaki et al. | |
| 7,241,332 B2 | 7/2007 | Yoshizawa et al. | |
| 7,297,199 B2 | 11/2007 | Osumi et al. | |
| 7,306,664 B2 * | 12/2007 | Kato et al. | 106/31.43 |
| 7,465,347 B2 | 12/2008 | Kitamura et al. | |
| 7,507,282 B2 | 3/2009 | Ozawa et al. | |
| 7,510,605 B2 | 3/2009 | Harada et al. | |
| 7,674,329 B2 * | 3/2010 | Koga et al. | 106/31.59 |
| 8,080,099 B2 * | 12/2011 | Saito et al. | 106/31.48 |

(Continued)

FOREIGN PATENT DOCUMENTS

JP    53085626    7/1978

(Continued)

OTHER PUBLICATIONS

JP Office Action dtd Nov. 12, 2010, JP Appln. 2009-051230, English translation.

*Primary Examiner* — Helene Klemanski
(74) *Attorney, Agent, or Firm* — Banner & Witcoff, Ltd.

(57) ABSTRACT

The present invention provides a water-based ink for ink-jet recording containing a coloring agent and water. The coloring agent contains a dye represented by the following general formula (1). The ink further includes a substance having a structure in which a carbon atom and a nitrogen atom are covalently bound.

9 Claims, 1 Drawing Sheet (1)

U.S. PATENT DOCUMENTS

| | | | | |
|---|---|---|---|---|
| 2004/0011247 A1* | 1/2004 | Taguchi | | 106/31.43 |
| 2004/0126510 A1* | 7/2004 | Wood et al. | | 106/31.43 |
| 2004/0134381 A1* | 7/2004 | Taguchi et al. | | 106/31.43 |
| 2004/0170779 A1* | 9/2004 | Wood et al. | | 106/31.43 |
| 2004/0207701 A1* | 10/2004 | Iinuma | | 106/31.43 |
| 2005/0126434 A1* | 6/2005 | Feldkamp | | 106/31.43 |
| 2008/0066644 A1* | 3/2008 | Park et al. | | 106/31.43 |
| 2008/0145561 A1 | 6/2008 | Kitamura et al. | | |
| 2008/0241398 A1 | 10/2008 | Kato et al. | | |
| 2008/0274283 A1 | 11/2008 | Tateishi et al. | | |
| 2009/0165672 A1 | 7/2009 | Ogura et al. | | |
| 2009/0167830 A1 | 7/2009 | Iwamura | | |
| 2011/0091696 A1* | 4/2011 | Tanaka et al. | | 428/195.1 |

FOREIGN PATENT DOCUMENTS

| | | |
|---|---|---|
| JP | 6-220380 A | 8/1994 |
| JP | 6228482 | 8/1994 |
| JP | 9-137111 A | 5/1997 |
| JP | 2000154344 | 6/2000 |
| JP | 2004339335 | 12/2004 |
| JP | 2006063329 | 3/2006 |
| JP | 2006063340 | 3/2006 |
| JP | 2006096995 | 4/2006 |
| JP | 2007-070566 A | 3/2007 |
| JP | 2007063520 | 3/2007 |
| JP | 2007-197477 A | 8/2007 |
| JP | 2008-031261 A | 2/2008 |
| JP | 2008246821 | 10/2008 |
| JP | 2009-155596 A | 7/2009 |
| JP | 2009-155597 A | 7/2009 |
| JP | 2009-155598 A | 7/2009 |
| JP | 2009-155601 A | 7/2009 |
| JP | 2009-155605 A | 7/2009 |
| JP | 2009-298966 A | 12/2009 |
| WO | 2006082669 | 8/2006 |

* cited by examiner

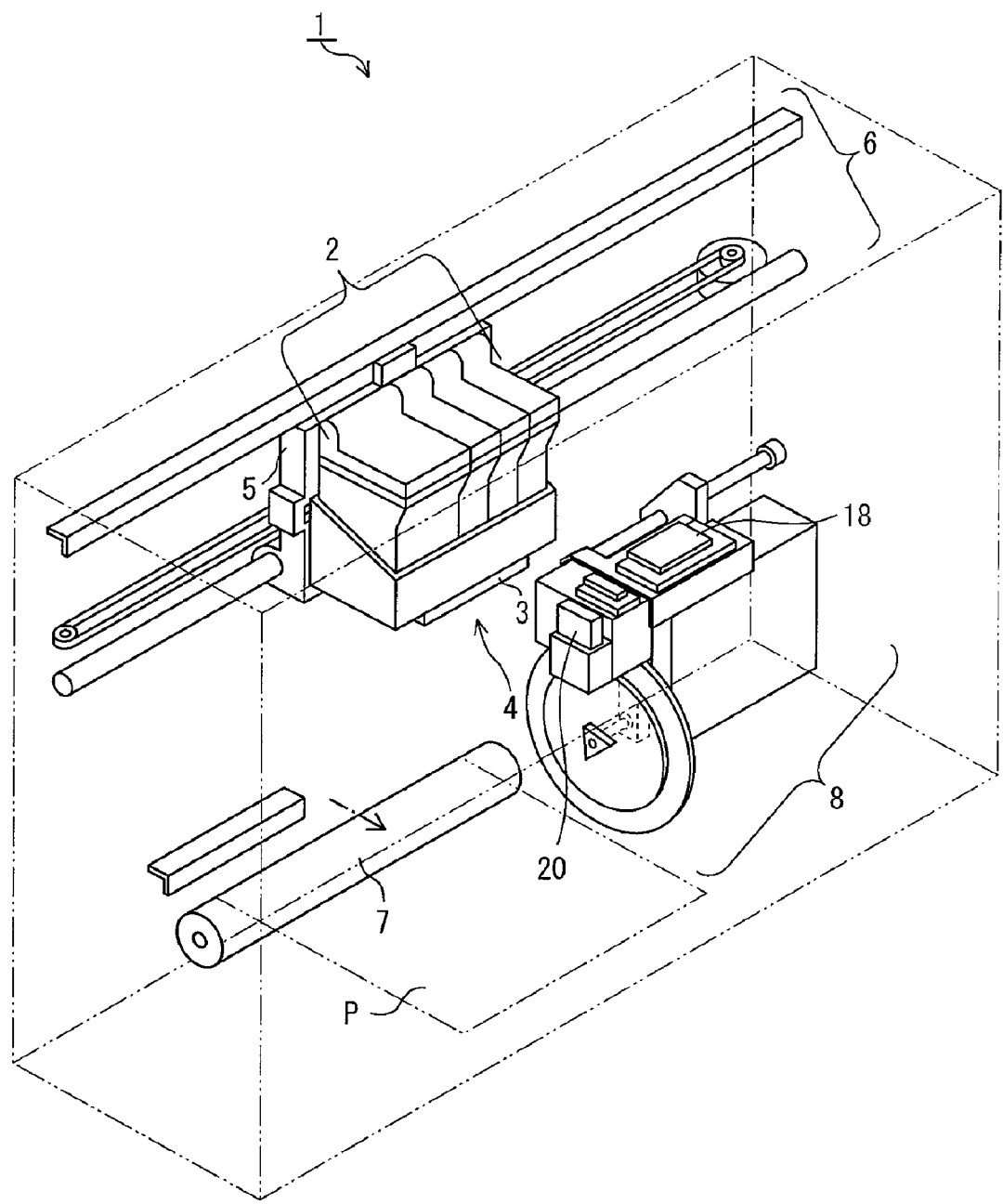

WATER-BASED INK FOR INK-JET RECORDING, INK CARTRIDGE, AND INK-JET RECORDING APPARATUS

CROSS-REFERENCE TO RELATED APPLICATION

This application claims priority from Japanese Patent Application Nos. 2008-273886 filed on Oct. 24, 2008 and 2009-051230 filed on Mar. 4, 2009. The entire subject matter of the Japanese Patent Applications is incorporated herein by reference.

BACKGROUND

Heretofore, a water-based yellow ink for ink-jet recording comprising a coloring agent and water has been used widely. The water-based ink is required to have superior toughness such as light resistance, ozone resistance, or the like of a recorded object. Further, the water-based ink is required to have superior storage stability without deteriorating during storage of a long period of time. However, there has been no conventional water-based ink that has superior toughness such as light resistance, ozone resistance, or the like of a recorded object, and has superior storage stability.

SUMMARY

A water-based ink for ink-jet recording comprises a coloring agent and water. The coloring agent comprises a dye represented by the following general formula (1), and the ink further comprises a substance having a structure in which a carbon atom and a nitrogen atom are covalently bound (CN-bond structure-comprising substance).

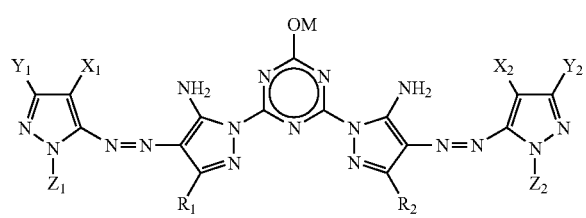

(1)

wherein in the general formula (1),
$R_1$, $R_2$, $Y_1$, and $Y_2$ each represent a monovalent group, and $R_1$, $R_2$, $Y_1$, and $Y_2$ may be the same or different;
$X_1$ and $X_2$ each represent an electron attractive group, and $X_1$ and $X_2$ may be the same or different;
$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and $Z_1$ and $Z_2$ may be the same or different; and
M represents a hydrogen atom, or a cation.

An ink cartridge comprises the water-based ink for ink-jet recording.

An ink-jet recording apparatus comprises an ink storing portion and an ink ejecting unit. An ink stored in the ink storing portion is ejected by the ink ejecting unit. The ink cartridge is stored in the ink storing portion.

BRIEF DESCRIPTION OF THE DRAWINGS

FIG. 1 is a schematic perspective view showing an example of the configuration of the ink-jet recording apparatus.

DETAILED DESCRIPTION

In the water-based ink for ink-jet recording, the dye represented by the general formula (1) in the ink may stabilize by the CN-bond structure-comprising substance.

In the water-based ink for ink-jet recording, the CN-bond structure-comprising substance may comprise aliphatic alcohol amine.

In the water-based ink for ink-jet recording, the aliphatic alcohol amine may comprise a compound represented by the general formula (2).

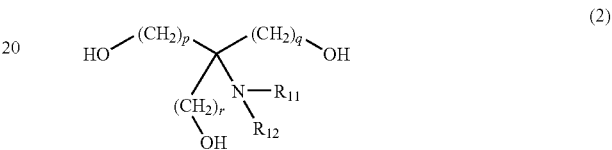

(2)

wherein in the general formula (2),
$R_{11}$ and $R_{12}$ each represent any atom or group, and $R_{11}$ and $R_{12}$ may be the same or different; and
p, q, and r each represent an integer of 1 to 3, and p, q, and r may be the same or different.

In the water-based ink for ink-jet recording, the compound represented by the general formula (2) may comprise at least one of 1,3-bis[1,1-bis(hydroxymethyl)-2-hydroxyethylamino]propane, and 2-[bis(2-hydroxyethyl)amino]-2-(hydroxymethyl)-1,3-propanediol.

The pH of the water-based ink for ink-jet recording may be in the range of about 8.0 to about 11.0. Setting of the pH of the ink in the aforementioned range makes it possible to obtain a water-based ink for ink-jet recording of better storage stability. The pH of the ink may be in the range of about 9.0 to about 10.0.

Next, the water-based ink for ink-jet recording (hereinafter, also may simply be referred to as "ink" or "water-based ink") is explained. The water-based ink for ink-jet recording comprises a coloring agent and water. The coloring agent comprises a dye represented by the general formula (1).

In the general formula (1), $R_1$, $R_2$, $Y_1$, and $Y_2$ each represent a monovalent group, and $R_1$, $R_2$, $Y_1$, and $Y_2$ may be the same or different. The monovalent group is a hydrogen atom, or a monovalent substituent. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxy carbonyloxy group, an amino group such as an alkylamino group, an arylamino group and the like, an amido group, an acylamino group, an ureido group, an amino carbonyl amino group, an alkoxy carbonyl amino group, an aryloxy carbonyl amino group, a sulfamoyl amino group, an alkyl sulfonyl amino group, an aryl sulfonyl amino group, an alkyl thio group, an aryl thio group, a heterocyclic thio group, a sulfamoyl group, an alkyl sulfinyl group, an aryl sulfinyl group, an alkyl sulfonyl group, an aryl sulfonyl group, an acyl group, an aryloxy carbonyl group, an alkoxy carbonyl group, a carbamoyl group, a phosphino group, a phosphinyl group, a phosphinyloxy group, a phosphinyl amino group, a silyl group, an azo group, an imido group and the like. Each may further have a substituent. Out of these, the monovalent substituent may be a hydrogen atom, a halogen atom, an alkyl group, an aryl group, a heterocyclic group, a cyano group, an alkoxy group, an amido group, an ureido group, an alkyl sulfonyl amino group, an aryl sulfonyl amino group, a sulfamoyl group, an alkyl sulfonyl group, an aryl sulfonyl group, a carbamoyl group, or an alkoxy carbonyl group. Further, the monovalent substituent may be a hydrogen atom, an alkyl group, an aryl group, a cyano group, or an alkyl sulfonyl group.

The halogen atom is a chlorine atom, a bromine atom, or an iodine atom. Out of these the halogen atom may be a chlorine atom, or a bromine atom.

The alkyl group includes a substituted or unsubstituted alkyl group. The substituted or unsubstituted alkyl group may be an alkyl group having 1 to 30 carbon atoms. Examples of the alkyl group include a methyl group, an ethyl group, a butyl group, a t-butyl group, an n-octyl group, an eicosyl group, a 2-chloroethyl group, a hydroxyethyl group, a cyano ethyl group, a 4-sulfobutyl group, and the like. Examples of the substituent of the substituted alkyl group include a straight or branched chain alkyl group having 1 to 12 carbon atoms such as a methyl group, an ethyl group, a propyl group, an isopropyl group, a sec-butyl group, a t-butyl group, a 2-ethylhexyl group, a 2-methyl sulfonyl ethyl group, a 3-phenoxypropyl group, a trifluoromethyl group, and the like; a straight or branched chain aralkyl group having 7 to 18 carbon atoms; a straight or branched chain alkenyl group having 2 to 12 carbon atoms; a straight or branched chain alkynyl group having 2 to 12 carbon atoms; a straight or branched chain cycloalkyl group having 3 to 12 carbon atoms such as a cyclopentyl group, and the like; a straight or branched chain cycloalkenyl group having 3 to 12 carbon atoms; a halogen atom such as a chlorine atom, a bromine atom, and the like; an aryl group such as a phenyl group, a 4-t-butylphenyl group, a 2,4-di-t-amyl phenyl group, and the like; a heterocyclic group such as an imidazolyl group, a pyrazolyl group, a thoriazolyl group, a 2-furyl group, a 2-thienyl group, a 2-pyrimidinyl group, a 2-benzothiazolyl group, and the like; a cyano group; a hydroxyl group; a nitro group; a carboxy group; an amino group; an alkoxy group such as a methoxy group, an ethoxy group, a 2-methoxyethoxy group, a 2-methyl sulfonyl ethoxy group, and the like; an aryloxy group such as a phenoxy group, a 2-methyl phenoxy group, a 4-t-butyl phenoxy group, a 3-nitro phenoxy group, a 3-t-butyloxy carbonyl phenoxy group, a 3-methoxy carbonylphenyloxy group, and the like; an acylamino group such as an acetamide group, a benzamide group, a 4-(3-t-butyl-4-hydroxy phenoxy)butane amide group, and the like; an alkylamino group such as a methylamino group, a butylamino group, a diethylamino group, a methyl butylamino group, and the like; an aryl amino group such as a phenyl amino group, a 2-chloroanilino group, and the like; an ureido group such as a phenylureido group, a methylureido group, an N,N-dibutylureido group, and the like; a sulfamoyl amino group such as an N,N-dipropyl sulfamoyl amino group, and the like; an alkyl thio group such as a methyl thio group, an octyl thio group, a 2-phenoxyethyl thio group, and the like; an aryl thio group such as a phenyl thio group, a 2-butoxy-5-t-octylphenyl thio group, a 2-carboxy phenyl thio group, and the like; an alkoxy carbonyl amino group such as a methoxy carbonyl amino group, and the like; an alkyl sulfonyl amino group such as a methyl sulfonyl amino group, and the like; an aryl sulfonyl amino group such as a phenyl sulfonyl amino group, a p-toluene sulfonyl amino group, and the like; a carbamoyl group such as an N-ethyl carbamoyl group, an N,N-dibutyl carbamoyl group, and the like; a sulfamoyl group such as an N-ethyl sulfamoyl group, an N,N-dipropyl sulfamoyl group, an N-phenyl sulfamoyl group, and the like; a sulfonyl group such as a methyl sulfonyl group, an octyl sulfonyl group, a phenyl sulfonyl group, a p-toluene sulfonyl group, and the like; an alkoxy carbonyl group such as a methoxy carbonyl group, a butyloxy carbonyl group, and the like; a heterocyclic oxy group such as a 1-phenyltetrazol-5-oxy group, a 2-tetrahydropyranyloxy group, and the like; an azo group such as a phenylazo group, a 4-methoxyphenyl azo group, a 4-pivaloylamino phenylazo group, a 2-hydroxy-4-propanoyl phenylazo group, and the like; an acyloxy group such as an acetoxy group, and the like; a carbamoyloxy group such as an N-methyl carbamoyloxy group, an N-phenylcarbamoyloxy group, and the like; a silyloxy group such as a trimethyl silyloxy group, a dibutyl methyl silyloxy group, and the like; an aryloxy carbonyl amino group such as a phenoxy carbonyl amino group, and the like; an imido group such as an N-succinimido group, an N-phthalimido group, and the like; a heterocyclic thio group such as a 2-benzothiazolyl thio group, a 2,4-diphenoxy-1,3,5-triazole-6-thio group, a 2-pyridylthio group, and the like; a sulfinyl group such as a 3-phenoxypropyl sulfinyl group, and the like; a phosphonyl group such as a phenoxy phosphonyl group, an octyloxy phosphonyl group, a phenyl phosphonyl group, and the like; an aryloxy carbonyl group such as a phenoxy carbonyl group, and the like; an acyl group such as an acetyl group, a 3-phenyl propanoyl group, a benzoyl group, and the like; and an ionic hydrophilic group such as a carboxyl group, a sulfo group, a phosphono group, a quaternary ammonium group, and the like; and the like. With respect to the alkyl group, the aralkyl group, the alkenyl group, the alkynyl group, the cycloalkyl group, and the cycloalkenyl group, which are the substituents of the substituted alkyl group, those having branched chains may be used because they improve the solubility of the dye and the stability of the ink, and those having asymmetric carbons may be used. Out of these, a hydroxy group, an alkoxy group, a cyano group, a halogen atom, a sulfo group (which may also be in the form of a salt) or a carboxyl group (which may also be in the form of a salt) may be used.

The cycloalkyl group includes a substituted or unsubstituted cycloalkyl group. The substituted or unsubstituted cycloalkyl group may be a cycloalkyl group having 5 to 30 carbon atoms. Examples of the substituent of the substituted cycloalkyl group include the substituents described for the substituted alkyl group. Examples of the cycloalkyl group include a cyclohexyl group, a cyclopentyl group, a 4-n-dodecyl cyclohexyl group, and the like.

The aralkyl group includes a substituted or unsubstituted aralkyl group. The substituted or unsubstituted aralkyl group may be an aralkyl group having 7 to 30 carbon atoms. Examples of the substituent of the substituted aralkyl group include the substituents described for the substituted alkyl group. Examples of the aralkyl group include a benzyl group, a 2-phenethyl group, and the like.

The alkenyl group is a straight chain, branched, or cyclic substituted or unsubstituted alkenyl group. The substituted or unsubstituted alkenyl group may have 2 to 30 carbon atoms. Examples of the substituent of the substituted alkenyl group include the substituents described for the substituted alkyl group. Examples of the alkenyl group include a vinyl group, an allyl group, a prenyl group, a geranyl group, an oleyl group, a 2-cyclopenten-1-yl group, a 2-cyclohexen-1-yl group, and the like.

The alkynyl group is a substituted or unsubstituted alkynyl group having 2 to 30 carbon atoms. Examples of the substituent of the substituted alkynyl group include the substituents described for the substituted alkyl group. Examples of the alkynyl group include an ethynyl group, a propargyl group, and the like.

The aryl group is a substituted or unsubstituted aryl group having 6 to 30 carbon atoms. Examples of the aryl group include a phenyl group, a p-tolyl group, a naphthyl group, an m-chlorophenyl group, an o-hexadecanoyl aminophenyl group, and the like. Examples of the substituent of the substituted aryl group include the substituents described for the substituted alkyl group.

The heterocyclic group is a monovalent group obtained by removing one hydrogen atom from a 5- or 6-membered substituted or unsubstituted, aromatic or nonaromatic heterocyclic compound, which may also be further condensed. The heterocyclic group may be a 5- or 6-membered aromatic heterocyclic group having 3 to 30 carbon atoms. Examples of the substituent of the substituted heterocyclic group include the substituents described for the substituted alkyl group. Examples of the heterocyclic group include, with no limitation on a substitution site, a pyridine group, a pyrazine group, a pyridazine group, a pyrimidine group, a triazine group, a quinoline group, an isoquinoline group, a quinazoline group, a cinnoline group, a phthalazine group, a quinoxaline group, a pyrrole group, an indole group, a furan group, a benzofuran group, a thiophene group, a benzothiophene group, a pyrazole group, an imidazole group, a benzimidazole group, a triazole group, an oxazole group, a benzoxazole group, a thiazole group, a benzothiazole group, an isothiazole group, a benzisothiazole group, a thiadiazole group, an isoxazole group, a benzisoxazole group, a pyrrolidine group, a piperidine group, a piperazine group, an imidazolidine group, a thiazoline group, and the like.

The alkoxy group includes a substituted or unsubstituted alkoxy group. The substituted or unsubstituted alkoxy group may be an alkoxy group having 1 to 30 carbon atoms. Examples of the substituent of the substituted alkoxy group include the substituents described for the substituted alkyl group. Examples of the alkoxy group include a methoxy group, an ethoxy group, an isopropoxy group, an n-octyloxy group, a methoxyethoxy group, a hydroxyethoxy group, a 3-carboxy propoxy group, and the like.

The aryloxy group may be a substituted or unsubstituted aryloxy group having 6 to 30 carbon atoms. Examples of the substituent of the substituted aryloxy group include the substituents described for the substituted alkyl group. Examples of the aryloxy group include a phenoxy group, a 2-methyl phenoxy group, a 4-t-butyl phenoxy group, a 3-nitro phenoxy group, a 2-tetradecanoyl amino phenoxy group, and the like.

The silyloxy group may be a silyloxy group having 3 to 20 carbon atoms. Examples of the silyloxy group include a trimethyl silyloxy group, a t-butyldimethyl silyloxy group, and the like.

The heterocyclic oxy group may be a substituted or unsubstituted heterocyclic oxy group having 2 to 30 carbon atoms. Examples of the substituent of the substituted heterocyclic oxy group include the substituents described for the substituted alkyl group. Examples of the heterocyclic oxy group include a 1-phenyltetrazol-5-oxy group, a 2-tetrahydropyranyloxy group, and the like.

The acyloxy group may be a formyloxy group, a substituted or unsubstituted alkyl carbonyloxy group having 2 to 30 carbon atoms, or a substituted or unsubstituted aryl carbonyloxy group having 6 to 30 carbon atoms. Examples of the substituent of the substituted alkyl carbonyloxy group or the substituted aryl carbonyloxy group include the substituents described for the substituted alkyl group. Examples of the acyloxy group include a formyloxy group, an acetyloxy group, a pivaloyloxy group, a stearoyloxy group, a benzoyloxy group, a p-methoxyphenyl carbonyloxy group, and the like.

The carbamoyloxy group may be a substituted or unsubstituted carbamoyloxy group having 1 to 30 carbon atoms. Examples of the substituent of the substituted carbamoyloxy group include the substituents described for the substituted alkyl group. Examples of the carbamoyloxy group include an N,N-dimethyl carbamoyloxy group, an N,N-diethyl carbamoyloxy group, a morpholino carbonyloxy group, an N,N-di-n-octyl amino carbonyloxy group, an N-n-octyl carbamoyloxy group, and the like.

The alkoxy carbonyloxy group may be a substituted or unsubstituted alkoxy carbonyloxy group having 2 to 30 carbon atoms. Examples of the substituent of the substituted alkoxy carbonyloxy group include the substituents described for the substituted alkyl group. Examples of the alkoxy carbonyloxy group include a methoxy carbonyloxy group, an ethoxy carbonyloxy group, a t-butoxy carbonyloxy group, an n-octyl carbonyloxy group, and the like.

The aryloxy carbonyloxy group may be a substituted or unsubstituted aryloxy carbonyloxy group having 7 to 30 carbon atoms. Examples of the substituent of the substituted aryloxy carbonyloxy group include the substituents described for the substituted alkyl group. Examples of the aryloxy carbonyloxy group include a phenoxy carbonyloxy group, a p-methoxyphenoxy carbonyloxy group, a p-n-hexadecyloxy phenoxy carbonyloxy group, and the like.

The amino group may be a substituted or unsubstituted alkylamino group having 1 to 30 carbon atoms, or a substituted or unsubstituted arylamino group having 6 to 30 carbon atoms. Examples of the substituents of the substituted alkylamino group and the substituted arylamino group include the substituents described for the substituted alkyl group. Examples of the amino group include an amino group, a methylamino group, a dimethylamino group, an anilino group, an N-methyl-anilino group, a diphenyl amino group, a hydroxyethylamino group, a carboxyethylamino group, a sulfoethylamino group, a 3,5-dicarboxy anilino group, and the like.

The acylamino group may be a formyl amino group, a substituted or unsubstituted alkyl carbonyl amino group having 1 to 30 carbon atoms, or a substituted or unsubstituted aryl carbonyl amino group having 6 to 30 carbon atoms. Examples of the substituents of the substituted alkyl carbonyl amino group and the substituted aryl carbonyl amino group include the substituents described for the substituted alkyl group. Examples of the acylamino group include a formylamino group, an acetylamino group, a pivaloylamino group, a lauroylamino group, a benzoylamino group, a 3,4,5-tri-n-octyloxyphenyl carbonyl amino group, and the like.

The amino carbonyl amino group may be a substituted or unsubstituted amino carbonyl amino group having 1 to 30 carbon atoms. Examples of the substituent of the substituted amino carbonyl amino group include the substituents described for the substituted alkyl group. Examples of the amino carbonyl amino group include a carbamoylamino group, an N,N-dimethylamino carbonyl amino group, an N,N-diethylamino carbonyl amino group, a morpholino carbonyl amino group, and the like.

The alkoxy carbonyl amino group may be a substituted or unsubstituted alkoxy carbonyl amino group having 2 to 30 carbon atoms. Examples of the substituent of the substituted alkoxy carbonyl amino group include the substituents described for the substituted alkyl group. Examples of the alkoxy carbonyl amino group include a methoxy carbonyl amino group, an ethoxy carbonyl amino group, a t-butoxy carbonyl amino group, an n-octadecyloxy carbonyl amino group, an N-methyl-methoxy carbonyl amino group, and the like.

The aryloxy carbonyl amino group may be a substituted or unsubstituted aryloxy carbonyl amino group having 7 to 30 carbon atoms. Examples of the substituent of the substituted aryloxy carbonyl amino group include the substituents described for the substituted alkyl group. Examples of the aryloxy carbonyl amino group include a phenoxy carbonyl amino group, a p-chlorophenoxy carbonyl amino group, an m-n-octyloxy phenoxy carbonyl amino group, and the like.

The sulfamoyl amino group may be a substituted or unsubstituted sulfamoyl amino group having 0 to 30 carbon atoms. Examples of the substituent of the substituted sulfamoyl amino group include the substituents described for the substituted alkyl group. Examples of the sulfamoyl amino group include a sulfamoyl amino group, an N,N-dimethylamino sulfonyl amino group, an N-n-octylamino sulfonylamino group, and the like.

The alkyl sulfonyl amino group may be a substituted or unsubstituted alkyl sulfonyl amino group having 1 to 30 carbon atoms. Examples of the substituent of the substituted alkyl sulfonyl amino group include the substituents described for the substituted alkyl group. Examples of the alkyl sulfonyl amino group include a methyl sulfonyl amino group, a butyl sulfonyl amino group, and the like.

The aryl sulfonyl amino group may be a substituted or unsubstituted aryl sulfonyl amino group having 6 to 30 carbon atoms. Examples of the substituent of the substituted aryl sulfonyl amino group include the substituents described for the substituted alkyl group. Examples of the aryl sulfonyl amino group include a phenyl sulfonyl amino group, a 2,3,5-trichlorophenyl sulfonyl amino group, a p-methyl phenyl sulfonyl amino group, and the like.

The alkyl thio group may be a substituted or unsubstituted alkyl thio group having 1 to 30 carbon atoms. Examples of the substituent of the substituted alkyl thio group include the substituents described for the substituted alkyl group. Examples of the alkyl thio group include a methyl thio group, an ethyl thio group, an n-hexadecyl thio group, and the like.

The aryl thio group may be a substituted or unsubstituted aryl thio group having 6 to 30 carbon atoms. Examples of the substituent of the substituted aryl thio group include the substituents described for the substituted alkyl group. Examples of the aryl thio group include a phenyl thio group, a p-chlorophenyl thio group, an m-methoxyphenyl thio group, and the like.

The heterocyclic thio group may be a substituted or unsubstituted heterocyclic thio group having 2 to 30 carbon atoms. Examples of a substituent of the substituted heterocyclic thio group include the same substituents as those described for the substituted alkyl group. Examples of the heterocyclic thio group include 2-benzothiazolyl thio group, and 1-phenyltetrazole-5-ylthio group, and the like.

The sulfamoyl group may be a substituted or unsubstituted sulfamoyl group having 0 to 30 carbon atoms. Examples of the substituent of the substituted sulfamoyl group include the substituents described for the substituted alkyl group. Examples of the sulfamoyl group include an N-ethyl sulfamoyl group, an N-(3-dodecyloxy propyl)sulfamoyl group, an N,N-dimethyl sulfamoyl group, an N-acetyl sulfamoyl group, an N-benzoyl sulfamoyl group, an N—(N'-phenyl carbamoyl)sulfamoyl group, and the like.

The alkyl sulfinyl group may be a substituted or unsubstituted alkyl sulfinyl group having 1 to 30 carbon atoms. Examples of the substituent of the substituted alkyl sulfinyl group include the substituents described for the substituted alkyl group. Examples of the alkyl sulfinyl group include a methyl sulfinyl group, an ethyl sulfinyl group, and the like.

The aryl sulfinyl group may be a substituted or unsubstituted aryl sulfinyl group having 6 to 30 carbon atoms. Examples of the substituent of the substituted aryl sulfinyl group include the substituents described for the substituted alkyl group. Examples of the aryl sulfinyl group include a phenyl sulfinyl group, a p-methyl phenyl sulfinyl group, and the like.

The alkyl sulfonyl group may be a substituted or unsubstituted alkyl sulfonyl group having 1 to 30 carbon atoms. Examples of the substituent of the substituted alkyl sulfonyl group include the substituents described for the substituted alkyl group. Examples of the alkyl sulfonyl group include a methyl sulfonyl group, an ethyl sulfonyl group, and the like.

The aryl sulfonyl group may be a substituted or unsubstituted aryl sulfonyl group having 6 to 30 carbon atoms. Examples of the substituent of the substituted aryl sulfonyl group include the substituents described for the substituted alkyl group. Examples of the aryl sulfonyl group include a phenyl sulfonyl group, a p-toluene sulfonyl group, and the like.

The acyl group may be a formyl group, a substituted or unsubstituted alkyl carbonyl group having 2 to 30 carbon atoms, a substituted or unsubstituted aryl carbonyl group having 7 to 30 carbon atoms, or a substituted or unsubstituted heterocyclic carbonyl group having 4 to 30 carbon atoms, bound to a carbonyl group through a carbon atom. Examples of the substituents of the substituted alkyl carbonyl group, the substituted aryl carbonyl group, and the substituted heterocyclic carbonyl group include the substituents described for the substituted alkyl group. Examples of the acyl group include an acetyl group, a pivaloyl group, a 2-chloroacetyl group, a stearoyl group, a benzoyl group, a p-n-octyloxy phenyl carbonyl group, a 2-pyridyl carbonyl group, a 2-furyl carbonyl group, and the like.

The aryloxy carbonyl group may be a substituted or unsubstituted aryloxy carbonyl group having 7 to 30 carbon atoms. Examples of the substituent of the substituted aryloxy carbonyl group include the substituents described for the substituted alkyl group. Examples of the aryloxy carbonyl group include a phenoxy carbonyl group, an o-chlorophenoxy carbonyl group, an m-nitrophenoxy carbonyl group, a p-t-butyl phenoxy carbonyl group, and the like.

The alkoxy carbonyl group may be a substituted or unsubstituted alkoxy carbonyl group having 2 to 30 carbon atoms. Examples of the substituent of the substituted alkoxy carbonyl group include the substituents described for the substituted alkyl group. Examples of the alkoxy carbonyl group include a methoxy carbonyl group, an ethoxy carbonyl group, a t-butoxy carbonyl group, an n-octadecyloxy carbonyl group, and the like.

The carbamoyl group may be a substituted or unsubstituted carbamoyl group having 1 to 30 carbon atoms. Examples of the substituent of the substituted carbamoyl group include the substituents described for the substituted alkyl group. Examples of the carbamoyl group include a carbamoyl group, an N-methyl carbamoyl group, an N,N-dimethyl carbamoyl group, an N,N-di-n-octyl carbamoyl group, an N-(methyl sulfonyl)carbamoyl group, and the like.

The phosphino group may be a substituted or unsubstituted phosphino group having 2 to 30 carbon atoms. Examples of the substituent of the substituted phosphino group include the substituents described for the substituted alkyl group. Examples of the phosphino group include a dimethyl phosphino group, a diphenyl phosphino group, a methyl phenoxy phosphino group, and the like.

The phosphinyl group may be a substituted or unsubstituted phosphinyl group having 2 to 30 carbon atoms. Examples of the substituent of the substituted phosphinyl group include the substituents described for the substituted alkyl group. Examples of the phosphinyl group include a phosphinyl group, a dioctyloxy phosphinyl group, a diethoxy phosphinyl group, and the like.

The phosphinyloxy group may be a substituted or unsubstituted phosphinyloxy group having 2 to 30 carbon atoms. Examples of the substituent of the substituted phosphinyloxy group include the substituents described for the substituted alkyl group. Examples of the phosphinyloxy group include a diphenoxy phosphinyloxy group, a dioctyloxy phosphinyloxy group, and the like.

The phosphinyl amino group may be a substituted or unsubstituted phosphinyl amino group having 2 to 30 carbon atoms. Examples of the substituent of the substituted phosphinyl amino group include the substituents described for the substituted alkyl group. Examples of the phosphinyl amino group include a dimethoxy phosphinyl amino group, a dimethylamino phosphinyl amino group, and the like.

The silyl group may be a substituted or unsubstituted silyl group having 3 to 30 carbon atoms. Examples of the substituent of the substituted silyl group include the substituents described for the substituted alkyl group. Examples of the silyl group include a trimethyl silyl group, a t-butyldimethyl silyl group, a phenyldimethyl silyl group, and the like.

Examples of the azo group include a phenyl azo group, a 4-methoxyphenyl azo group, a 4-pivaloylamino phenyl azo group, a 2-hydroxy-4-propanoyl phenyl azo group, and the like.

Examples of the imido group include an N-succinimido group, an N-phthalimido group, and the like.

In the general formula (1), $X_1$ and $X_2$ each represent an electron attractive group, and $X_1$ and $X_2$ may be the same or different. Examples of the $X_1$ and $X_2$ include an acyl group, an acyloxy group, a carbamoyl group, an alkoxy carbonyl group, an aryloxy carbonyl group, a cyano group, a nitro group, a dialkyl phosphono group, a diaryl phosphono group, a diaryl phosphinyl group, an alkyl sulfinyl group, an aryl sulfinyl group, an alkyl sulfonyl group, an aryl sulfonyl group, a sulfonyloxy group, an acyl thio group, a sulfamoyl group, a thiocyanate group, a thiocarbonyl group, an alkyl halide group, an alkoxy halide group, an aryloxy halide group, an alkylamino halide group, an alkyl thio halide group, an aryl group substituted with another electron attractive group, a heterocyclic group, a halogen atom, an azo group, a selenocyanate group, and the like.

$X_1$ and $X_2$ each may be an acyl group having 2 to 12 carbon atoms, an acyloxy group having 2 to 12 carbon atoms, a carbamoyl group having 1 to 12 carbon atoms, an alkoxy carbonyl group having 2 to 12 carbon atoms, an aryloxy carbonyl group having 7 to 18 carbon atoms, a cyano group, a nitro group, an alkyl sulfinyl group having 1 to 12 carbon atoms, an aryl sulfinyl group having 6 to 18 carbon atoms, an alkyl sulfonyl group having 1 to 12 carbon atoms, an aryl sulfonyl group having 6 to 18 carbon atoms, a sulfamoyl group having 0 to 12 carbon atoms, an alkyl halide group having 1 to 12 carbon atoms, an alkoxy halide group having 1 to 12 carbon atoms, an alkyl thio halide group having 1 to 12 carbon atoms, an aryloxy halide group having 7 to 18 carbon atoms, an aryl group having 7 to 18 carbon atoms, substituted with two or more electron attractive groups other than the aryl group, and a 5- to 8-membered heterocyclic group having 1 to 18 carbon atoms and having a nitrogen atom, an oxygen atom, or a sulfur atom.

In the general formula (1), $Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and $Z_1$ and $Z_2$ may be the same or different. Examples of the alkyl group, the alkenyl group, the alkynyl group, the aralkyl group, the aryl group, and the heterocyclic group are the same as those described for $R_1$, $R_2$, $Y_1$, and $Y_2$.

In the general formula (1), M represents a hydrogen atom or a cation. The cation is an alkali metal ion, an ammonium ion, or a quaternary ammonium ion. The cation may be Li, Na, K, $NH_4$, or $NR_4$. R represents an alkyl group or an aryl group, and examples thereof are same as those of $R_1$, $R_2$, $Y_1$, and $Y_2$. Out of these, the cation may be Li, Na, K, or $NH_4$.

As for the combination of the substituents of the dye represented by the general formula (1), at least one of various substituents may be the aforementioned group. Further, a larger number of various substituents may be the aforementioned groups. Moreover, all the substituents may be the aforementioned groups.

The combinations of the substituents of the dye represented by the general formula (1) include the following (I) to (V).

(I) $R_1$ and $R_2$ may be the same or different, a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. Out of these, $R_1$ and $R_2$ may be a straight chain alkyl group or branched alkyl group having 1 to 8 carbon atoms, a secondary or tertiary alkyl group, or a t-butyl group.

(II) $X_1$ and $X_2$, each represent an electron attractive group, may be the same or different, a cyano group, an alkyl sulfonyl group having 1 to 12 carbon atoms, an aryl sulfonyl group having 6 to 18 carbon atoms, or a sulfamoyl group having 0 to 12 carbon atoms. Out of these, $X_1$ and $X_2$ may be a cyano group, or an alkyl sulfonyl group having 1 to 12 carbon atoms.

(III) $Y_1$ and $Y_2$ may be the same or different, a hydrogen atom, a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. $Y_1$ and $Y_2$ may be a hydrogen atom, or a substituted or unsubstituted alkyl group. Out of these, $Y_1$ and $Y_2$ may be a hydrogen atom.

(IV) $Z_1$ and $Z_2$ may be the same or different, a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. $Z_1$ and $Z_2$ may be a substituted or unsubstituted aryl group, or a substituted or unsubstituted heterocyclic group. Out of these, $Z_1$ and $Z_2$ may be a substituted aryl group.

(V) M may be a hydrogen atom, an alkali metal ion, an ammonium ion, or a quaternary ammonium ion. Out of these, M may be a hydrogen atom, Li, Na, K, or $NH_4$.

Specific examples of the dye represented by the general formula (1) include compounds represented by the following structural formulae (1-A) to (1-E). In the following structural formulae (1-A) to (1-E), $C_4H_9(t)$ represents a t-butyl group.

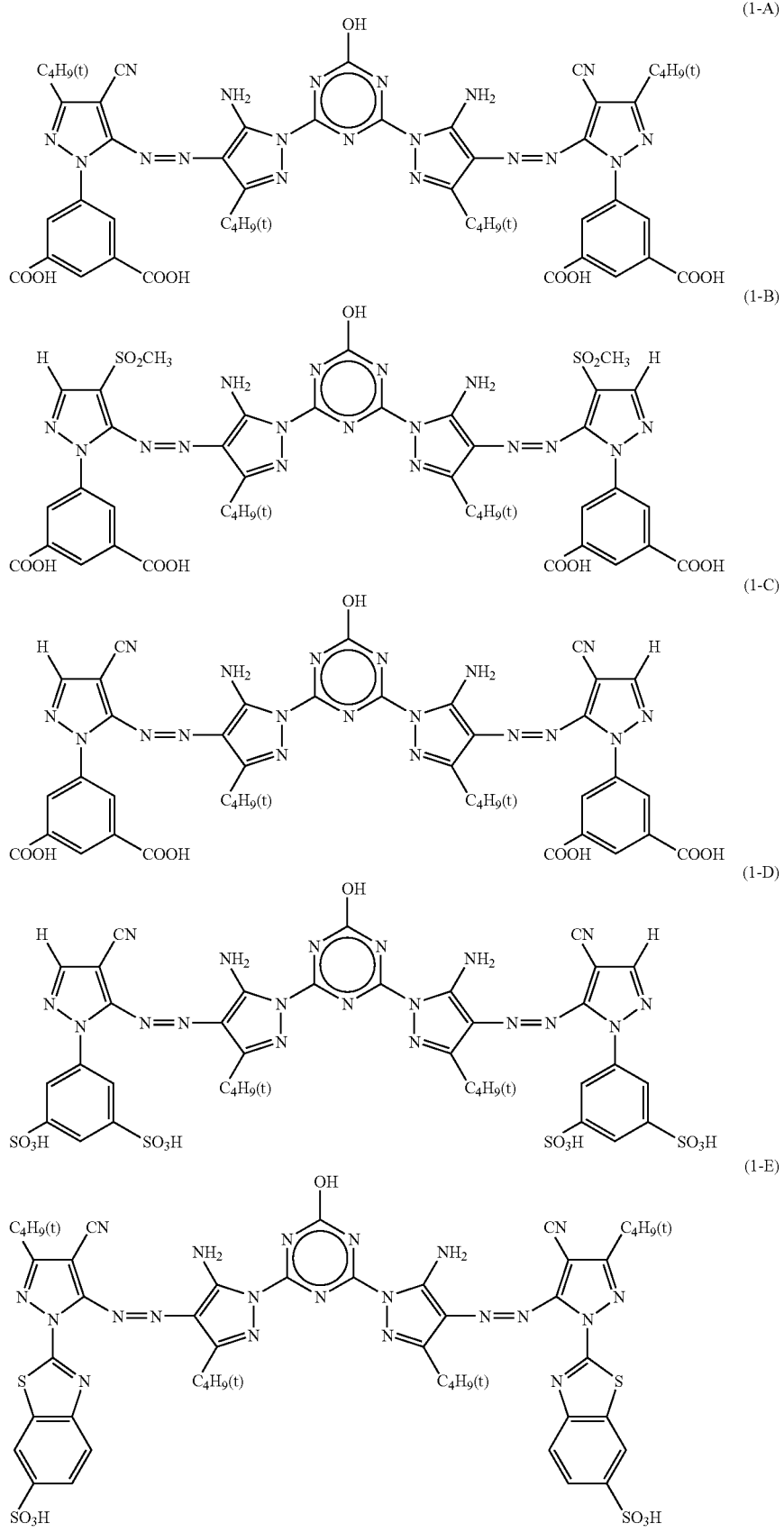

The amount of the dye, which is represented by the general formula (1), to be added is not particularly limited. When a water-based ink comprises the dye represented by the general formula (1), toughness of a recorded object that is recorded with the water-based ink may be improved. The amount of the dye, which is represented by the general formula (1), to be added with respect to the total amount of the ink is, for example, in the range of about 0.1 wt % to about 7 wt %, and about 0.2 wt % to about 5 wt %.

The coloring agent may contain only the dye represented by the general formula (1) or may further contain other dyes, pigments, and the like.

The water may be ion-exchange water or purified water. The amount of the water to be added with respect to the total amount of the ink is, for example, in the range of about 10 wt % to about 90 wt %, and about 40 wt % to about 80 wt %. The amount of the water to be added may be a balance of the other components, for example.

The water-based ink for ink-jet recording further comprises the CN-bond structure-comprising substance. The CN-bond structure-comprising substance has a function of stabilizing the dye represented by the general formula (1). For example, suppression of decomposition of the dye represented by the general formula (1) by the CN-bond structure-comprising substance makes it possible to reduce an absorbance change rate of the ink. The CN-bond structure-comprising substance may have a function of stabilizing a pH. In this case, when the pH of the ink is maintained in the aforementioned range by the CN-bond structure-comprising substance, it also contributes to stabilization of the dye represented by the general formula (1).

The CN-bond structure-comprising substance is not particularly limited, and examples thereof comprise aliphatic alcohol amine, amino acid, and the like. As described above, the CN-bond structure-comprising substance may comprise aliphatic alcohol amine. The aliphatic alcohol amine may be primary amine, secondary amine, or tertiary amine. An aliphatic group having a hydroxy end in the aliphatic alcohol amine is, for example, an aliphatic group having a straight or branched chain hydroxy end having 1 to 7 carbon atoms, and examples thereof include a hydroxymethyl group, a hydroxyethyl group, a hydroxypropyl group, a hydroxybutyl group, —C(CH$_2$OH)$_3$, —(CH$_2$)$_3$NHC(CH$_2$OH)$_3$, and the like. When an isomer exists in the aliphatic group having the hydroxy end, any isomer is applicable. For example, in a case of a "hydroxyethyl group", it may be a 1-hydroxyethyl group or a 2-hydroxyethyl group. The aliphatic alcohol amine may comprise plural amino groups. Further, the aliphatic alcohol amine may comprise plural hydroxy groups.

The aliphatic alcohol amine may comprise a compound represented by the general formula (2). In the general formula (2), $R_{11}$ and $R_{12}$ are not particularly limited and each may be any atom or group. Further, $R_{11}$ and $R_{12}$ may be the same or different. Examples of $R_{11}$ and $R_{12}$ comprise hydrogen atoms, aliphatic groups, aliphatic groups having hydroxy ends, and the like. For example, $R_{11}$ and $R_{12}$ may be a hydrogen atom, a hydroxymethyl group, a hydroxyethyl group, —(CH$_2$)$_3$NHC(CH$_2$OH)$_3$, or the like. When an isomer exists in $R_{11}$ and $R_{12}$, any isomer is applicable. For example, in a case of a "hydroxyethyl group", it may be a 1-hydroxyethyl group or a 2-hydroxyethyl group. As described above, in the general formula (2), p, q, and r each represent an integer of 1 to 3, and p, q, and r may be the same or different. Specific examples of the compound represented by the general formula (2) comprise
1,3-bis[1,1-bis(hydroxymethyl)-2-hydroxyethylamino]propane (structural formula (2-A)), and
2-[bis(2-hydroxyethyl)amino]-2-(hydroxymethyl)-1,3-propanediol (structural formula (2-B)).

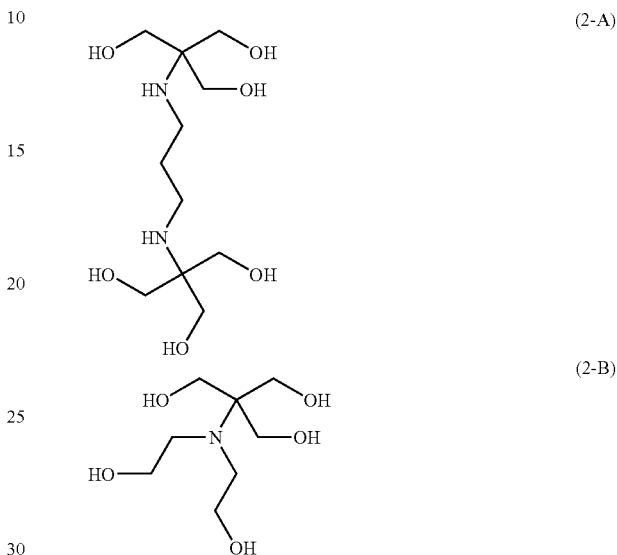

The amino acid is not particularly limited and examples thereof include lysine, arginine, hydroxylysine, and the like. Out of these, the amino acid may be lysine or arginine. The amino acid may be either L-type or D-type.

The amount of the CN-bond structure-comprising substance to be added is not particularly limited. For example, when the CN-bond structure-comprising substance has a function of stabilizing a pH, the amount of the CN-bond structure-comprising substance to be added may be determined such that the pH of the water-based ink falls within the aforementioned range. The amount of the CN-bond structure-comprising substance to be added per 100 wt % of the ink is, for example, in the range of about 0.005 wt % to about 10 wt %, about 0.005 wt % to about 8 wt %, and about 0.005 wt % to about 5 wt %, although it differs according to the type, amount, or the like of the coloring agent.

One of the CN-bond structure-comprising substances may be used alone or two or more of them may be used in combination.

The water-based ink for ink-jet recording may further comprise a humectant and a penetrant. The humectant prevents an ink from drying at a nozzle portion of an ink-jet head, for example. The penetrant adjusts a drying rate of an ink on a recording medium, for example.

The humectant is not particularly limited, and examples thereof include lower alcohol such as methyl alcohol, ethyl alcohol, n-propyl alcohol, isopropyl alcohol, n-butyl alcohol, sec-butyl alcohol, t-butyl alcohol, and the like; amide such as dimethylformamide, dimethylacetamide, and the like; ketone such as acetone, and the like; ketoalcohol such as diacetone alcohol, and the like; ether such as tetrahydrofuran, dioxane, and the like; polyalcohol such as polyalkylene glycol, alkylene glycol, glycerin, and the like; 2-pyrrolidone; N-methyl-2-pyrrolidone; 1,3-dimethyl-2-imidazolidinone; and the like. The polyalkylene glycol is not particularly limited, and examples thereof include polyethylene glycol, polypropylene glycol, and the like. The alkylene glycol is not particularly limited and examples thereof include ethylene glycol, propylene glycol, butylene glycol, diethylene glycol, triethylene glycol, dipropylene glycol, tripropylene glycol, thiodiglycol, hexylene glycol, and the like. Out of these, the humectant may be polyalcohol such as alkylene glycol, glycerin, and the like. One of the humectants may be used alone or two or more of them may be used in combination.

The amount of the humectant to be added with respect to the total amount of the ink (the proportion of the humectant in the ink) is not particularly limited and is, for example, in the range of 0 wt % to about 95 wt %, about 5 wt % to about 80 wt %, and about 5 wt % to about 50 wt %.

The penetrant is not particularly limited, and an example thereof includes glycol ether. The glycol ether is not particularly limited, and examples thereof include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone or two or more of them may be used in combination.

The amount of the penetrant to be added with respect to the total amount of the ink (the proportion of the penetrant in the ink) is not particularly limited and is, for example, in the range of 0 wt % to about 20 wt %. Setting of the proportion of the penetrant in the aforementioned range makes it possible to achieve suitable penetration of the water-based ink relative to a recording medium such as a recording paper. The proportion of the penetrant may be in the range of about 0.1 wt % to about 15 wt %, and about 0.5 wt % to about 10 wt %.

The water-based ink for ink-jet recording may further comprise a conventionally known additive as required. Examples of the additive include a surfactant, a viscosity modifier, a surface tension modifier, a mildewproofing agent, and the like. Examples of the viscosity modifier include polyvinyl alcohol, cellulose, water-soluble resin, and the like.

The water-based ink for ink-jet recording may be prepared by uniformly mixing the coloring agent, water, and the CN-bond structure-comprising substance with other added components as required by a conventionally known method, and then removing sediments with a filter, for example.

The water-based ink for ink-jet recording of may be used as a water-based yellow ink. The water-based ink for ink-jet recording may be a water-based ink of a color other than yellow by further comprising a coloring agent other than a coloring agent for yellow.

Next, the ink cartridge is explained. As described above, the ink cartridge comprises the water-based ink for ink-jet recording. As a body of the ink cartridge, for example, a conventionally known body may be used.

Next, the ink-jet recording apparatus is explained. The ink-jet recording apparatus comprises an ink storing portion and an ink ejecting unit, and an ink stored in the ink storing portion is ejected by the ink ejecting unit. The ink cartridge is stored in the ink storing portion. Other than this, the ink-jet recording apparatus may have a structure similar to that of a conventionally known ink-jet recording apparatus, for example.

FIG. 1 shows a structure of an example of the ink-jet recording apparatus. As shown in FIG. 1, the ink-jet recording apparatus 1 comprises four ink cartridges 2, an ink ejecting unit (ink-jet head) 3, a head unit 4, a carriage 5, a drive unit 6, a platen roller 7, and a purge device 8 as main components.

The four ink cartridges 2 comprise water-based inks of four colors, namely, yellow, magenta, cyan, and black, respectively. For example, an ink cartridge comprising the water-based yellow ink is the aforementioned ink cartridge. The ink-jet head 3 performs recording on a recording medium P such as a recording paper. The head unit 4 is provided with the ink-jet head 3. The four ink cartridges 2 and the head unit 4 are mounted to the carriage 5. The drive unit 6 reciprocates the carriage 5 in a straight line. A conventionally known drive unit (for example, JP2008-246821) may be used as the drive unit 6. The platen roller 7 extends in a reciprocating direction of the carriage 5 and opposes to the ink-jet head 3. The recording includes recording of letters, images; printing; and the like.

The recording medium P is fed from a paper feeding cassette (not shown) positioned on a side of or underneath the ink-jet recording apparatus 1. The recording medium P is introduced between the ink-jet head 3 and the platen roller 7. Then, a predetermined recording is performed on the recording medium P with the ink ejected from the ink-jet head 3. The recording medium P then is discharged from the ink-jet recording apparatus 1. In FIG. 1, a feeding mechanism and a discharging mechanism of the recording medium P are not shown.

The purge unit 8 draws poor ink containing, for example, air bubbles trapped inside the ink-jet head 3. A conventionally known purge unit (for example, JP2008-246821) may be used as the purge unit 8.

At the platen roller 7 side of the purge unit 8, a wiper member 20 is provided adjacent to the purge unit 8. The wiper member 20 has a spatula shape, and wipes a nozzle-formed surface of the ink-jet head 3 in accordance with the movement of the carriage 5. In FIG. 1, the cap 18 covers the plural nozzles of the ink-jet head 3, which return to the reset position after the completion of recording in order to prevent the ink from drying.

In the ink-jet recording apparatus, the four ink cartridges may be mounted to plural carriages. Alternatively, the four ink cartridges may not be mounted to the carriage, but may be provided and fixed in the ink-jet recording apparatus. In this state, for example, the ink cartridges and the head unit mounted to the carriage are connected via a tube, or the like, and the ink is supplied to the head unit from the ink cartridge.

The present invention provides a dye stabilizer for stabilizing dyes comprised in a water-based ink for ink-jet recording. The dye stabilizer comprises a CN-bond structure-comprising substance. The present invention also provides a method for stabilizing dyes comprised in a water-based ink for ink-jet recording. In this method, the ink comprises dyes and the above-described dye stabilizer.

Dyes to which the above-described dye stabilizer and dye stabilizing method are applicable are not particularly limited, and examples thereof comprise dyes represented by the general formula (1). In the dye stabilizer and the dye stabilizing method, the type, blended amount, and the like of the CN-bond structure-comprising substance may be the same as those in the water-based ink for ink-jet recording.

EXAMPLES

Examples of the present invention are described together with Comparative Examples, which are provided for illustrative purposes only. The present invention is not limited by the following Examples and Comparative Examples.

Examples 1 to 7 and Comparative Examples 1 and 2

With respect to Examples 1 to 7 and Comparative Example 1, ink components and CN-bond structure-comprising substances (Table 1) were uniformly mixed. With respect to Comparative Example 2, ink components (table 1) were uniformly mixed. Thereafter, thus obtained mixtures were each filtered with a hydrophilic polytetrafluoroethylene (PTFE) type membrane filter having a pore diameter of 0.20 μm manufactured by Toyo Roshi Kaisha, Ltd. Thus, water-based inks for ink-jet recording of Examples 1 to 7 and Comparative Examples 1 and 2 were obtained. In the following Table 1, the dyes (1-A) and (1-B) are compounds represented by the structural formulae (1-A) and (1-B), respectively. Further, CN-bond structure-comprising substances (2-A) and (2-B) are compounds represented by the structural formulae (2-A) and (2-B), respectively.

With respect to each water-based ink of Examples and Comparative Examples, (a) storage stability evaluation, (b) ozone resistance evaluation, and (c) light resistance evaluation were carried out by the following methods. Samples for (b) ozone resistance evaluation and (c) light resistance evaluation were prepared as follows.

First, each ink cartridge was filled with each water-based ink of Examples and Comparative Examples. Next, each ink cartridge was attached to an ink-jet printer mounted digital multi-function center DCP-330C manufactured by Brother Industries, Ltd. Then, a gradation sample of the water-based ink was printed on a glossy photo paper BP61GLA manufactured by Brother Industries, Ltd., and thereby an evaluation patch having an initial OD value of 1.0 was obtained. The OD value was measured with a spectrophotometer, Spectrolino (light source: $D_{65}$; observer: 2°; and status A), manufactured by GretagMacbeth.

(a) Storage Stability Evaluation

Each water-based ink of Examples and Comparative Examples was diluted with purified water by 1600 times. Absorbance of the dilution at a wavelength of 440 nm was measured using an ultraviolet-visible-near-infrared spectrophotometer, UV3600, manufactured by Shimadzu Corporation. The measurement of the absorbance was carried out using a measurement cell with a length of 10 mm. Separately, the water-based ink was contained in a sealed container and stored for two weeks under an environment of 60° C. Next, the water-based ink after storage was diluted with purified water by 1600 times and absorbance of the dilution was measured in the same manner as the water-based ink of before storage. Then, an absorbance change rate (%) was obtained with the following formula (1) and storage stability was evaluated according to the following Evaluation Criteria. In the following formula (1), |X−Y| represents an absolute value of the difference between X and Y. The smaller the absorbance change rate becomes, the more the decomposition of the dye is suppressed, which means the storage ability of the water-based ink is higher.

$$\text{Absorbance change rate (\%)} = (|X-Y|/X) \times 100 \quad \text{(I)}$$

X: Absorbance before storage
Y: Absorbance after storage
  Storage Stability Evaluation Criteria
G: Absorbance change rate is less than 5%
NG: Absorbance change rate is 5% or more (b) Ozone Resistance Evaluation Using an ozone weather meter, OMS-H, manufactured by SUGA TEST INSTRUMENTS CO., LTD, the gradation sample was left for 40 hours in a condition in which an ozone concentration was 2 ppm, a bath temperature was 24° C., and a bath relative humidity was 60%. Then, the OD value of the evaluation patch after being left was measured in the same manner as described above. Next, the OD value change rate (%) was obtained with the following formula (II) and ozone resistance was evaluated according to the following Evaluation Criteria. In the following formula (II), |X−Y| represents an absolute value of the difference between X and Y. The smaller the OD value change rate becomes, the less the image quality is deteriorated, which means the ozone resistance of the water-based ink is higher.

$$\text{OD value change rate (\%)} = (|X-Y|/X) \times 100 \quad \text{(II)}$$

X: 1.0 (initial OD value)
Y: OD value after being left
  Ozone Resistance Evaluation Criteria
G: OD value change rate is less than 10%
NG: OD value change rate is 10% or more (c) Light Resistance Evaluation Using a super xenon weather meter, SC750-WN, manufactured by SUGA TEST INSTRUMENTS CO., LTD, the gradation sample was irradiated with a xenon lamp for 200 hours in a condition in which a bath temperature was 25° C., a bath relative humidity was 50%, and illuminance was 93 klx. Then, the OD value of the evaluation patch after irradiation was measured in the same manner as described above. Next, the OD value change rate (%) was obtained with the following formula (III) and light resistance was evaluated according to the following Evaluation Criteria. In the following formula (III), |X−Y| represents an absolute value of the difference between X and Y. The smaller the OD value change rate becomes, the less the image quality is deteriorated, which means the light resistance of the water-based ink is higher.

$$\text{OD value change rate (\%)} = (|X-Y|/X) \times 100 \quad \text{(III)}$$

X: 1.0 (initial OD value)
Y: OD value after irradiation
  Light Resistance Evaluation Criteria
G: OD value change rate is less than 10%
NG: OD value change rate is 10% or more

TABLE 1

| | | Example | | | | | | | Comparative Example | |
|---|---|---|---|---|---|---|---|---|---|---|
| | | 1 | 2 | 3 | 4 | 5 | 6 | 7 | 1 | 2 |
| Ink | Dye (1-A) | 3.0 | — | 3.0 | 3.0 | 3.0 | — | — | — | 3.0 |
| Composition | Dye (1-B) | — | 3.0 | — | — | — | 3.0 | 3.0 | — | — |
| (wt %) | C.I. Direct Yellow 132 | — | — | — | — | — | — | — | 3.0 | — |
| | Glycerin | 8.5 | 8.5 | 8.5 | 8.5 | 8.5 | 8.5 | 12.8 | 8.5 | 8.5 |

TABLE 1-continued

|  |  | Example |  |  |  |  |  |  | Comparative Example |  |
|---|---|---|---|---|---|---|---|---|---|---|
|  |  | 1 | 2 | 3 | 4 | 5 | 6 | 7 | 1 | 2 |
|  | Polyethylene glycol 200 | 11.5 | 11.5 | 11.5 | 11.5 | 11.5 | 11.5 | 7.2 | 11.5 | 11.5 |
|  | Triethylene glycol n-butyl ether | 4.0 | 4.0 | 4.0 | 4.0 | 4.0 | 4.0 | 4.0 | 4.0 | 4.0 |
|  | SUNNOL ® NL1430 (1*) | 0.2 | 0.2 | 0.2 | 0.2 | 0.2 | 0.2 | 0.2 | 0.2 | 0.2 |
|  | water | 72.8 | 72.8 | 72.8 | 72.8 | 72.8 | 72.8 | 72.8 | 72.8 | 72.8 |
| CN-bond structure-comprising substance (wt %) | CN-bond structure-comprising substance (2-A) | 3.5 | — | 0.01 | 0.005 | — | — | 3.6 | 3.9 | — |
|  | CN-bond structure-comprising substance (2-B) | — | 4.5 | — | — | — | — | — | — | — |
|  | L-(+)-lysine | — | — | — | — | 1.0 | — | — | — | — |
|  | L-(+)-arginine | — | — | — | — | — | 0.4 | — | — | — |
| pH |  | 9.9 | 9.8 | 8.4 | 8.1 | 10.0 | 10.0 | 10.0 | 9.9 | 7.8 |
| Evaluation | Storage stability | G | G | G | G | G | G | G | G | NG |
|  | Absorbance change rate | 1.5% | 2.0% | 1.7% | 1.0% | 3.7% | 2.5% | 4.2% | 1.6% | 8.5% |
|  | Ozone resistance | G | G | G | G | G | G | G | NG | G |
|  | OD value change rate | 4% | 5% | 6% | 6% | 4% | 4% | 5% | 45% | 5% |
|  | Light resistance | G | G | G | G | G | G | G | NG | G |
|  | OD value change rate | 7% | 6% | 8% | 8% | 6% | 6% | 7% | 60% | 8% |

(1*) polyoxyethylene (3E.O.) alkyl (C = 12, 13) ether sodium sulfate, manufactured by Lion Corporation, active ingredient amount = 28 wt %

As summarized in Table 1, with respect to each water-based ink of Examples 1 to 7, all results of the storage stability evaluation, the ozone resistance evaluation, and the light resistance evaluation were good. In contrast, the water-based ink of Comparative Example 1 was inferior in results of the ozone resistance evaluation and the light resistance evaluation because it does not comprise the dye represented by the general formula (1). Further, the water-based ink of Comparative Example 2 was inferior in a result of the storage stability evaluation because it does not comprise CN-bond structure-comprising substance.

It will be obvious to those having skill in the art that many changes may be made in the above-described details of the particular aspects described herein without departing from the spirit or scope of the invention as defined in the appended claims.

What is claimed is:

1. A water-based ink for ink-jet recording comprising:

a coloring agent; and water, wherein the coloring agent comprises a dye represented by the following general formula (1), and the ink further comprises a substance having a structure in which a carbon atom and a nitrogen atom are covalently bound; wherein the substance is at least one of 1,3-bis[1,1-bis(hydroxymethyl)-2-hydroxyethylamino]propane, 2-[bis(2-hydroxyethyl)amino]-2-(hydroxymethyl)-1,3-propanediol, lysine, and arginine;

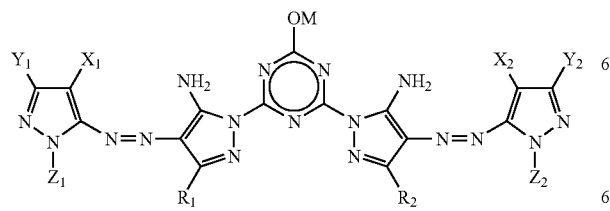

(1)

wherein in the general formula (1), $R_1$, $R_2$, $Y_1$, and $Y_2$ each represent a monovalent group, and $R_1$, $R_2$, $Y_1$, and $Y_2$ may be the same or different;

$X_1$ and $X_2$ each represent an electron attracting group, and $X_1$ and $X_2$ may be the same or different;

$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and $Z_1$ and $Z_2$ may be the same or different; and M represents a hydrogen atom or a cation.

2. The water-based ink for ink-jet recording according to claim 1, stabilizing the dye represented by the general formula (1) in the ink by the substance having a structure in which a carbon atom and a nitrogen atom are covalently bound.

3. The water-based ink for ink-jet recording according to claim 1, wherein the substance comprises at least one of 1,3-bis[1,1-bis(hydroxymethyl)-2-hydroxyethylamino]propane and 2-[bis(2-hydroxyethyl)amino]-2-(hydroxymethyl)-1,3-propanediol.

4. The water-based ink for ink-jet recording according to claim 1, wherein a pH of the water-based ink is in a range of about 8.0 to about 11.0.

5. An ink cartridge comprising a water-based ink for ink-jet recording, wherein the water-based ink is the water-based ink for ink-jet recording according to claim 1.

6. An ink-jet recording apparatus comprising:

an ink storing portion; and an ink ejecting unit, an ink stored in the ink storing portion being ejected by the ink ejecting unit, wherein the ink cartridge according to claim 5 is stored in the ink storing portion.

7. The water-based ink for ink-jet recording according to claim 1, wherein the dye represented by the general formula (I) is at least one of a compound represented by the structural formula (I-A) and a compound represented by the structural formula (1-B).

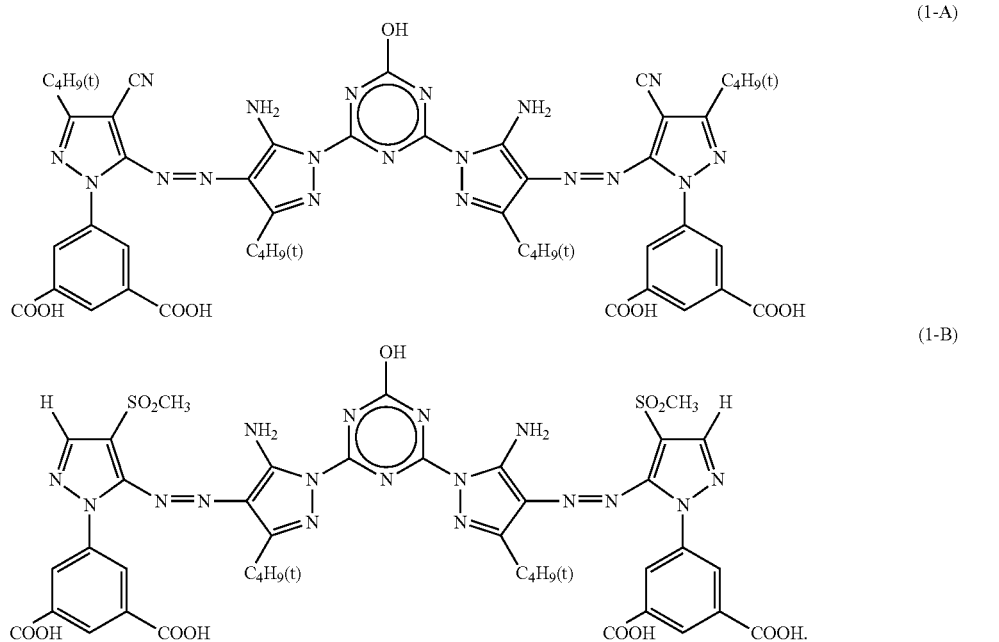

8. The water-based ink for ink-jet recording according to claim 1, further comprising an ether sulfate surfactant.

9. A water-based ink for ink-jet recording comprising:
a coloring agent; and
water,
wherein the coloring agent comprises a dye of at least one of a compound represented by the structural formula (I-A) and a compound represented by the structural formula (1-B), the ink further comprises a substance having a structure in which a carbon atom and a nitrogen atom are covalently bound, the substance having a structure in which a carbon atom and a nitrogen atom are covalently bound is at least one selected from the group consisting of 1,3-bis[1,1-bis(hydroxymethyl)-2-hydroxyethylamino]propane, 2-[bis(2-hydroxyethyl)amino]-2-(hydroxymethyl)-1,3-propanediol, lysine, and arginine, and an amount of the substance having a structure in which a carbon atom and a nitrogen atom are covalently bound is 0.005 parts by weight to 4.5 parts by weight with respect to 100 parts by weight of the ink;

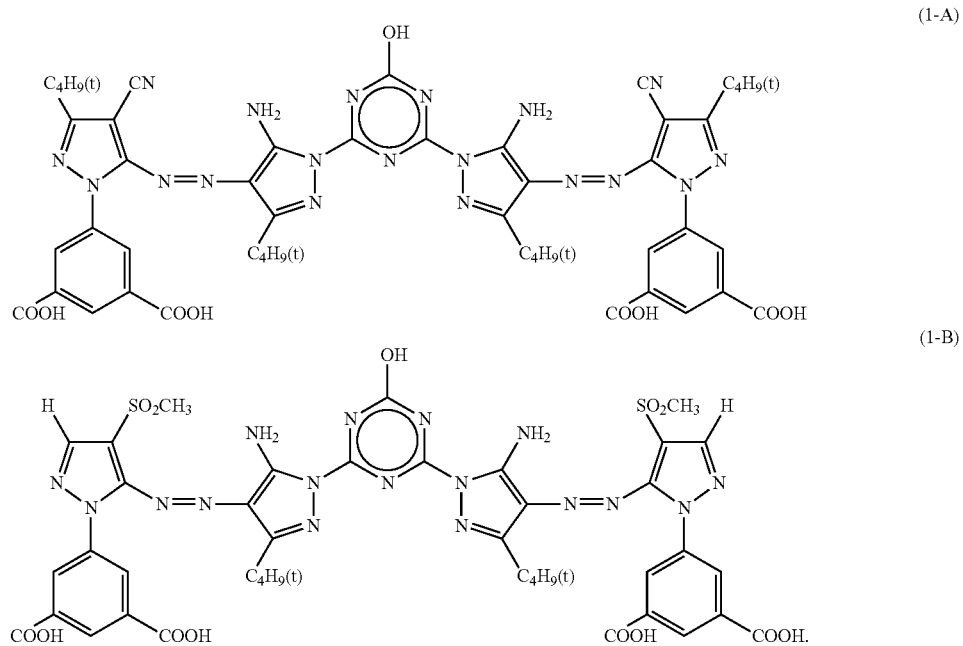

* * * * *